United States Patent

[11] 3,573,359

[72] Inventor Barrett Earl Guisinger
Deerfield, Ill.

[21] Appl. No. 726,867
[22] Filed May 6, 1968
[45] Patented Apr. 6, 1971
[73] Assignee Ampex Corporation
Redwood City, Calif.

[54] VIDEO TAPE APPARATUS HAVING SYNC SIGNAL CONTROL DROPOUT COMPENSATION
32 Claims, 7 Drawing Figs.

[52] U.S. Cl. .......... 178/6.6
[51] Int. Cl. .......... G11b 5/04, H04n 5/78
[50] Field of Search .......... 178/6.6 (A), 6.6 (DO)

[56] References Cited
UNITED STATES PATENTS

| | | | |
|---|---|---|---|
| 3,408,457 | 10/1968 | Boylan .......... | 178/6.6 |
| 3,356,921 | 12/1967 | Bradford .......... | 178/6.6 |
| 3,322,892 | 5/1967 | Yasuoka .......... | 178/6.6 |
| 2,944,108 | 7/1960 | Houghton .......... | 178/6.6 |
| 2,854,526 | 9/1958 | Morgan .......... | 178/6.6 |

*Primary Examiner*—Bernard Konick
*Assistant Examiner*—Steven B. Pokotilow
*Attorneys*—Anderson, Luedeka, Fitch, Even and Tabin and Robert G. Clay

ABSTRACT: A recorded composite video signal having periodic dropout intervals is processed by a system which provides an indication of the position and duration of such dropout intervals and maintains the output signal at a fixed level during these intervals. Circuitry may be provided for inserting horizontal synchronizing pulses during each dropout interval. A system is also disclosed which detects the dropout intervals, and is employed in the above processing system as well as in a system for maintaining the stretch of the recording tape-medium constant by deriving a signal indication thereof from comparison of the horizontal synchronizing pulses before and after each dropout interval. A tension-controlling mechanism is responsive to the signal, and applies suitable tension on the tape.

INVENTOR
BARRETT E. GUISINGER

ATTYS.

INVENTOR
BARRETT E. GUISINGER

ATTYS.

INVENTOR
BARRETT E. GUISINGER

Anderson, Luedeka, Fitch, Even & Tabin
ATTYS.

INVENTOR
BARRETT E. GUISINGER
Anderson, Luedeka, Fitch, Even & Tabin
ATTYS.

INVENTOR
BARRETT E. GUISINGER

Anderson, Luedeka, Fitch, Even & Tabin
ATTYS.

CC1036

INVENTOR
BARRETT E GUISINGER

Anderson, Luedeka, Fitch, Even & Tabin
ATTYS.

VIDEO TAPE APPARATUS HAVING SYNC SIGNAL CONTROL DROPOUT COMPENSATION

The present invention relates to video tape apparatus, and more particularly to such apparatus of the type wherein the transducing head is periodically out of operative relationship with the record medium.

The various aspects of the present invention have particular application to the helical scan type of video tape-reproducing apparatus employing the so-called Omega wrap. In general, in this type of wrap, the tape enters the scan system from a supply reel and capstan, passes around a first guide, travels around a head drum in helical fashion and leaves the drum around a second guide spaced from the first. In traveling around the drum from the first to the second guides the tape travels somewhat less than 360°. At the same time, the pitch of the helix moves the tape laterally nearly one tape width in the passage of the tape around the head drum. The head rotates in the direction opposite to that of the tape and traverses parallel paths obliquely across the tape. The head is rotated to traverse the tape once for each video field. In the gap between the tape guides there is no tape adjacent the head drum, and there is a small distance beyond these guides before the tape can be engaged by the head. In video tape recorders employing this type of wrap, no signal is recorded on the tape during the interval when the head is not in contact with the tape. This absence of recorded signal is known as "signal dropout." When the record is reproduced, this dropout is a no-signal region on the ultimate picture, and is normally positioned to occur at the beginning or end of each video field so as not to appear in the center of the picture where its occurrence would be conspicuous. The dropout region may commonly be positioned near the end of each video field just prior to the vertical synchronization interval.

The presence of this periodic dropout interval introduces a number of deleterious effects with respect to the reproduction of the video signal. For example, even though the position of the dropout on the tape may be controlled during recording, the absence of signal for some duration during each video field produces a relatively high noise level during this interval, and consequently flashes of light may occur in the picture for a period corresponding to the number of lines occurring during this interval. Also, even though the dropout is positioned just prior to or immediately after the vertical synchronizing interval, during the duration of the dropout, there is a loss of horizontal synchronizing pulses, tending to produce some instability in the picture quality.

As a matter of general background, video processing amplifiers are, of course, now well known and commonly used in television tape recorders to provide a relatively noise-free composite video output that meets recognized broadcast standards. The general necessity for providing a processing amplifier is due to the inherent characteristics of television tape recorders which produce serious noise pulses in the video and other portions of the signal which may be attributed to various causes, including momentary dropouts and switching. This produces a poor signal-to-noise ratio for the system, which is not well suited for application to the synchronizing circuits of a standard television transmitter or receiver. Additionally, when the usual frequency modulated composite video signal is recorded on the magnetic tape employed in the recorder, and thereafter transduced and demodulated to produce the composite signal, certain undesirable frequency components due to the carrier are present, in addition to the noise components previously mentioned. Such undesirable frequency components appear particularly on the blanking pedestals and synchronizing pulses which tends to interfere with horizontal and vertical synchronizing functions. Since standard television transmitters are generally provided with amplifying networks which reform the composite wave with respect to the shape of the synchronizing pulses, and which also apply clamping for DC restoration, the noise components tend to cause variable clamping in the video portion of the wave when a composite video signal is applied to such an amplifying network from a magnetic recording and reproducing system. The result is that substantial portions of the desired video signal may be clamped improperly, and the reproduced image distorted where the signal is not processed. Thus processing amplifiers are commonly provided in video recording equipment which may clip the noise from the incoming synchronizing pulses, reshape the pulse form and recombine it with the video signal to produce a composite video signal of broadcast quality.

In accordance with one aspect of the present invention, a system is provided in conjunction with such a video processing amplifier, to eliminate, in addition to those undesirable effects just mentioned, the distortion and degradation of the television picture otherwise produced by the presence of the dropout intervals in each field of the video signal.

It is a further object to provide such a system which derives an indication of the position and duration of the dropout intervals in each video field by preselected settings or, alternatively, by detection of the dropout intervals themselves.

It is still a further object in accordance with this aspect of the present invention to accomplish this result in a relatively uncomplicated and economical manner, and to provide such a system which is compatible with single head video tape recorders, and which does not require auxiliary transducer heads or lower the utilization factor of the magnetic tape.

It is another object to provide a system for use in conjunction with a video processing amplifier for determining the position and duration of each dropout interval from the vertical synchronizing signal on the record medium, and to provide a constant predetermined video output level during that interval with horizontal synchronizing pulses appropriately inserted therein, while otherwise providing a noise-free composite video signal, including those signal specifically required for color television operation.

Another significant problem area connected with the use of video recorders is in controlling and maintaining the tension on the video tape so that it remains constant. Variation of the tension on the tape produces timing errors which may cause a noticeable bend at the top of the video picture. The magnitude of this bend depends generally on the magnitude of the timing error in the applied television signal, and generally occurs only at the top of the picture because of the relatively short time constant of the flywheel circuit in standard television receivers as compared to the field time. Thus, in a period of several lines, the flywheel circuit will compensate for the error, and the bend is produced only at the top of the picture where the timing error was maximum.

Prior systems are known for eliminating this error by comparing the incoming horizontal synchronizing signal to a timing signal obtained from the average timing of the synchronizing pulses, and producing an error voltage which is compared with a tachometer signal taken from the rotating head drum. This signal then controls the magnitude of a direct current to a tension producing solenoid which regulates the tension of the tape.

It is a further object in accordance with another aspect of the present invention to utilize the signal dropout interval on the tape, produced by the mechanical arrangement of the recorder mechanism previously described and generally considered an undesirable feature of such recorders, to control and maintain the tape tension constant by utilizing only the signals from the tape, and without the necessity of using external tachometer pulses. Thus, the presence of the dropout interval is utilized to advantage in effecting a simplification in the tension-controlling apparatus.

In connection with this aspect of the present invention, it is a further object to provide a system for controlling the tension of a magnetic tape having a modulated composite video signal thereon by providing an indication of the phase change between the horizontal synchronizing pulses of the video signal just prior to the dropout interval and just after the dropout interval to indicate the occurrence of any change in tape tension, and to provide control means responsive to such indication for maintaining the tape tension constant.

Still further, it is an object of the present invention to provide a system for detecting the presence, position and duration of the dropout intervals in each video field, and to provide a signal output indicative thereof which may be utilized for processing or control functions in video tape apparatus.

It is also an object of the present invention to provide a system which achieves the immediately foregoing object by monitoring the horizontal synchronizing pulses of the video signal and deriving an indication of the dropout position and duration therefrom.

These and other objects and aspects of the invention are more particularly set forth in the following detailed description, and in the accompanying drawings of which:

VIDEO PROCESSING AMPLIFIER—I

Figure 1:
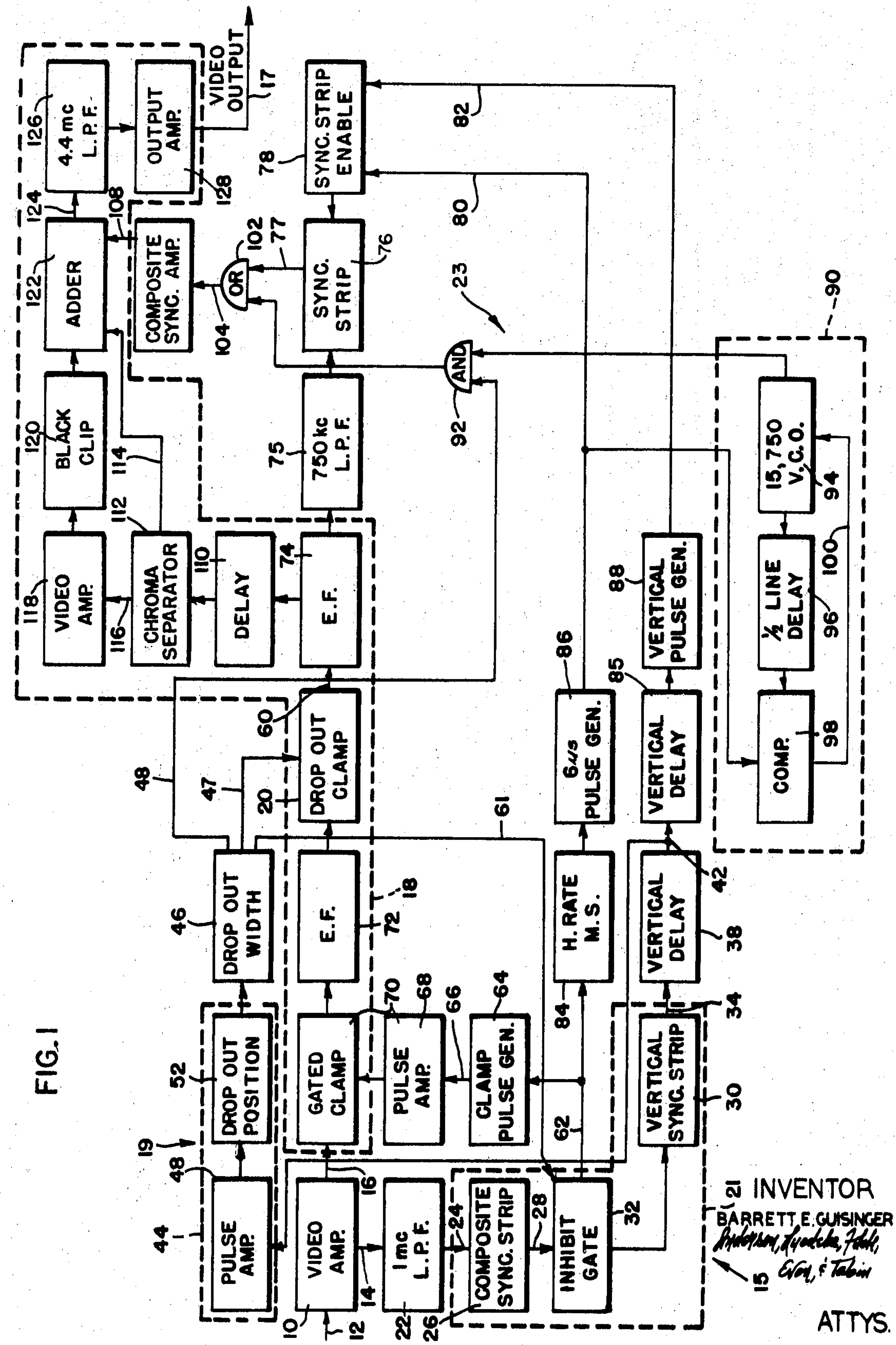
FIG. 1 is a block diagram of a video processing amplifying system employing the dropout-detecting and processing features in accordance with one embodiment of the present invention.

Referring now to FIG. 1, there is shown a video processing system in accordance with one aspect of the present invention for determining the position and duration of the dropout in a composite video signal which has been reproduced from a magnetic record medium and the processing of this signal to obtain the aforesaid objects. In accordance with this embodiment of the invention, the system, in general, comprises a video amplifier 10 which receives the modulated composite video signal through the input lead 12 from a single head electromagnetic transducer (not shown) and provides an amplified version of the input on each of two output leads 14 and 16. The amplifier output lead 14 provides the signal for the control circuit means, indicated generally as 15, constituting the signal control path of the present system, while the amplifier output on lead 16 provides the signal for the main circuit means, generally indicated as 18, constituting the main or primary signal path or channel of the present system to the output terminal means 17.

The control circuit means 15 includes dropout signal means, generally indicated as 19, for providing a signal indicative of the position and duration of the dropout interval in the input signal based on the time position or occurrence of the vertical synchronizing pulse, and the main circuit means 18 includes a controllable clamping means 20 in the main signal path which is responsive to the dropout signal means 19 which clamps the output of the clamping means 20 to a predetermined level, such as the black level, for the period of the dropout interval, but otherwise passes the video signal therethrough to the output terminal means 17. The control circuit means 15 further comprises pulse-inserting means 23, hereinafter described in detail, which inserts suitable horizontal synchronizing pulses in the video signal of the main circuit path 18 during the dropout interval to provide optimum picture stability. Additional system circuits, to be hereinafter described, are provided for eliminating the noise normally occurring just prior to and during the dropout interval and for preventing this noise from impairing the functioning of the control circuit means 15. Circuits are also provided for stripping, processing, and reinsertion of the synchronizing pulses, and for eliminating the transmission of undesirable frequency components to the output terminal 17.

Considering now the system of FIG. 1 with greater particularity, synchronizing pulse stripping means 21 is provided in the signal control path 14, and is responsive to the video amplifier output on lead 14 after passing through a 1-megacycle low-pass filter 22 having its output 24 feeding the stripping means 21. The low-pass filter 22 eliminates high-frequency noise from the signal fed to the stripping means 21, and in the illustrated embodiment, the stripping means 21 includes a composite synchronizing-pulse stripping circuit 26 for providing an output on lead 28 of only the composite synchronizing pulses which are then fed to a vertical synchronizing-pulse stripping circuit 30 through a normally open controllable inhibit gate 32. The output of the vertical synchronizing-pulse stripping circuit 30 on lead 34 is a signal containing only the vertical synchronizing pulses. These pulses are illustrated as 36 and 36′ in FIG. 2*a* wherein the pulses are shown spaced one field apart.

First delay means 38 is serially connected to the output lead 34 from the vertical synchronizing-pulse stripping circuit 30 and provides an output pulse 40 (shown in FIG. 2*b*) on output lead 42 which is of a predetermined duration and serves to reference both the dropout interval positions and the processing of the vertical synchronizing pulses.

The output from the vertical delay means 38 is fed to a pulse-generating means 44 and provides an output pulse indicative of the position of the dropout interval on the record medium. A variable pulse width generating means 46 is responsive to the output of the pulse generator means 44 and provides an output pulse indicative of the duration of the dropout interval and its position with respect to the vertical synchronizing pulses. This output pulse serves as a control signal on lead 47 to the controllable clamping means 20, a gating signal on lead 48 to the horizontal synchronizing pulse-inserting means 23, and a further gating signal to the inhibit gate 32.

More particularly, the vertical delay means 38, which may comprise a conventional monostable multivibrator, produces pulses 40, 40′, etc., as shown in FIG. 2*b*, corresponding to each of the vertical synchronizing pulses. The trailing edge of each vertical delay output pulse passes through a pulse amplifier 48 which produces an output pulse 50, illustrated in FIG. 2*c*, which triggers the dropout position monostable multivibrator 52 to produce the pulse 54 shown in FIG. 2*d*. The duration of the dropout position pulse 54 is adjusted to reference the dropout interval from the record medium, the beginning of which corresponds generally to the trailing edge of the pulse 54. Thus, the dropout position multivibrator 52 is adjusted with a suitable time constant so that the trailing edge of its output pulse 54 falls just prior to the commencement of the dropout interval. The variable pulse width means 46 may comprise any suitable pulse stretcher which produces an output pulse 56, as shown in FIG. 2*e*, indicative of the width or duration of the dropout interval, having its leading edge coinciding in time with the trailing edge of the dropout position pulse 54 and its trailing edge adjusted to fall just after the end of the dropout interval. Thus, the duration of the dropout width pulse 56 is slightly wider than, but generally coextensive with the period of the dropout interval. This slightly greater width of pulse 56 aids in preventing the noise which is generally present in the region of the dropout interval from passing into the system because the clamping and gating functions which it controls extend from before to after the dropout interval.

The dropout width pulse 56 is then fed to the dropout clamping means 20 which clamps the video signal in the main channel 18 to the black level during the duration of this pulse, but otherwise permits the normal video signal to pass therethrough to lead 60. In this manner, the video signal in the main channel, which is ultimately fed to the output of the processing amplifier, is uninterrupted by the absence of signal during the dropout interval, and the noise generally present during this interval is not fed to the output of the amplifier.

The dropout width pulse 56 from the pulse stretcher 46 is also fed back to the inhibit gate 32 via lead 61 to initiate the inhibit function thereof. This blocks the signal control means 15 during the dropout interval and prevents the noise generally occurring just prior to and during the dropout interval from triggering the pulse-generating circuits which are normally driven by the synchronizing pulses.

An additional output 62 from the inhibit gate 32 for composite synchronizing pulses is provided and supplies the control basis for eliminating the presence of noise on the backporch portions of the video signal in the main channel 18 and for controlling the processing of the horizontal synchronizing pulses. The composite synchronizing signal on lead 62 is fed to a clamp pulse generator 64 triggered by the trailing edge of each synchronizing pulse to produce a pulse output on lead 66 having a pulse width of sufficient duration to produce, after amplification by a pulse amplifier 68, activation of a gated clamp 70 during the backporch portion of each horizontal synchronizing pulse. The gated clamp 70 is the type referred to as a "soft clamp" which clamps the backporch of the signal to the black level but does not destroy the color burst present in this portion of the video signal. This may be accomplished by employing a capacitor in the clamping circuit to average the burst, which then "rides" on the clamped backporch portion of the signal. Thus, noise pulses present on this portion of the video signal are prevented from passing through the main channel 18 of the amplifier.

An emitter-follower circuit 72 couples the gated clamp 70 to the dropout clamp 20 for impedance matching purposes, and the signal from clamp 20 on lead 60 (illustrated in FIG. 2*h*) comprises the video 71, color burst (not shown), horizontal and vertical synchronizing signals 73 and 75 respectively, and equalizing pulses 77. The portion 79 is clamped to the black level during the dropout interval in each field.

The signal on lead 60 is then fed along the main channel 18 through another emitter-follower 74, as well to a 750 kc. low-pass filter 75, which passes only the composite synchronizing signal therethrough; the synchronizing pulses are controllably stripped in response to horizontal and vertical control or gating pulses, and then reinserted into the video signal in the main channel to provide a "clean" synchronizing signal at output terminal 17. This is accomplished by a synchronizing-pulse stripper 76 coupled to the output of the low-pass filter 75 which provides a synchronizing-pulse output on lead 77 only when an enabling signal is received from an enable circuit 78 coupled thereto.

Figures 2, 3:
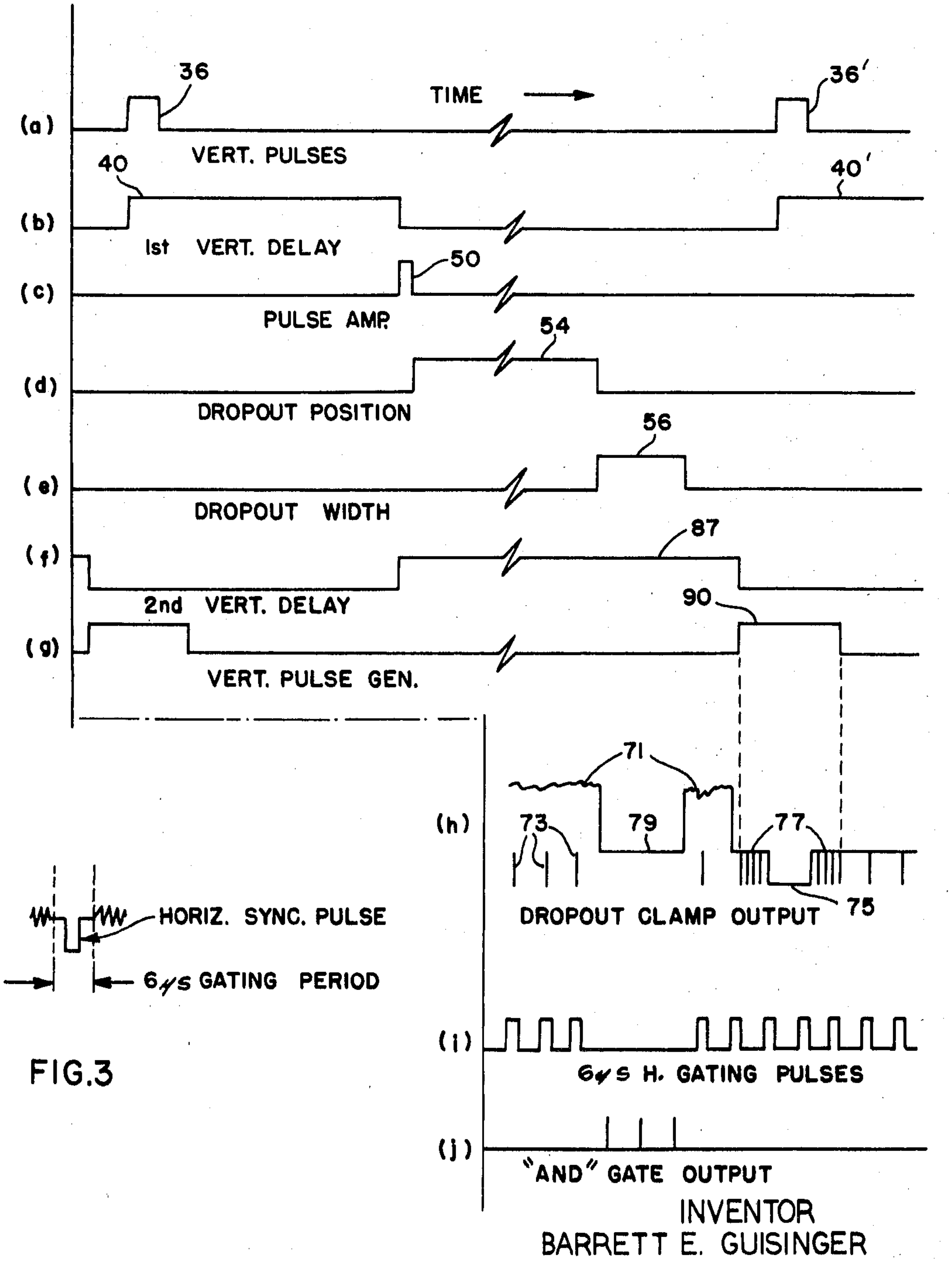
FIG. 2 is a series of graphical representations (*a* ) through (*j*) showing the voltage waveforms occurring at various points of the system shown in FIG. 1 to illustrate the operation thereof.
FIG. 3 is a graphical representation showing the time relation between the gating pulses (*i*) and the horizontal synchronizing pulses (*h*) of FIG. 2, on an expanded time scale.

The enable circuit 78 is activated by either a horizontal gating pulse on input 80 or a vertical gating pulse on input 82. The horizontal input 80 is derived from the inhibit gate output 62 which supplies the composite synchronizing signal to a horizontal rate monostable multivibrator 84. This circuit generate pulses at the 15,750 horizontal rate, eliminating the equalizing pulses of the composite synchronizing signal. The output pulses from the multivibrator 84, which correspond to the horizontal synchronizing pulses on a one-to-one basis, drive a pulse generator 86, which produces the horizontal gating pulses on lead 80. This horizontal gating signal, illustrated in FIG. 2*i*, is formed by pulses corresponding, on a one-to-one basis, to the horizontal synchronizing pulses, but having a duration of 6 microseconds, which is somewhat wider than the horizontal synchronizing pulses, so that substantially only the synchronizing pulses are present on output lead 77, and the adjacent regions of the signal are blocked. It should be noted that since these horizontal gating pulses are derived from the composite synchronizing signal, no gating pulses are produced during the dropout interval, as shown. The time relationship between the horizontal gating pulses of FIG. 2*i* with the horizontal synchronizing pulses appearing on the stripper output lead 77 (and as shown in FIG. 2*h*) is shown generally in FIG. 3 on an expanded time basis to illustrate the manner in which the undesirable components remaining on the pedestal adjacent the horizontal synchronizing pulses are removed by the selective gating of the enable circuit 78.

Turning now to the vertical gating pulse input 82 to the enable circuit 78, the delayed vertical pulse 40 from the delay circuit 38 is fed to a second vertical delay circuit 85 for producing a pulse 87, as shown in FIG. 2*f*. The delay circuit 85 may comprise a conventional monostable multivibrator, and is triggered by the trailing edge of the first vertical delay pulse 40. The trailing edge of the second vertical delay pulse occurs about one line prior to the beginning of the succeeding vertical synchronizing pulse 36′ or at the commencement of the equalizing pulses as shown in FIG. 2*f* and *h*. The trailing edge of the second vertical delay pulse 86 triggers a vertical pulse generator 88, the pulse output of which is shown as 90 in FIG. 2*g* and has a duration which coincides with the time period from the beginning of the first equalizing pulse before the vertical synchronizing pulse to the last equalizing pulse after the vertical synchronizing pulse. This is illustrated in FIG. 2*g* and *h*. The pulse 90 is the vertical gating pulse and is fed via lead 82 to the stripper enable circuit 78.

Turning now to the pulse-inserting means 23 which inserts suitable horizontal synchronizing pulses in the video signal of the main circuit path 18 during the dropout interval, a phase-controlled oscillator, generally indicated as 90, is responsive to the 6 microsecond pulses from the pulse generator 86 on lead 80 and provides a pulse train having the horizontal synchronizing rate to one input of an AND logic gate 92. The other input thereto is supplied from the dropout width pulse stretcher 46 via lead 48. Thus, the AND logic provides pulses corresponding to the horizontal synchronizing pulses only when pulse 56 from the dropout width circuit 46 occurs. Since the pulse 56 is essentially coextensive in time with the dropout interval (actually being somewhat wider than the dropout interval, as previously mentioned), the pulse output from the AND logic 92 occurs only during the dropout interval. The phase-controlled oscillator 90 comprises a voltage-controlled oscillator 94 which provides a first output to the AND logic 92 and a second output to a one-half line delay circuit 96. A phase-comparing circuit or comparator 98 receives the horizontal gating pulses from the pulse generator 86 and compares the phase thereof with the output of the delay 96 to produce an error voltage on lead 100 which feeds back to the voltage-controlled oscillator 94 to maintain its output in phase with the horizontal gating pulses, and consequently with the horizontal synchronizing pulses in the video signal. The output from the phase-controlled oscillator 90 is of course continuous and is present both during the dropout interval and otherwise. The phase comparison circuit 98 may be of known type employing a ramp generator and a sample-and-hold circuit, each ramp pulse being sampled by the output of the one-half line delay 96, producing an error voltage on lead 100 depending on the magnitude of the ramp voltage at the time of the sampling. The delay circuit 96 may comprise a monostable multivibrator with a delayed reset, and the oscillator 94 desirably has a relatively long time constant so that the output is maintained essentially constant during the dropout interval during which there is an absence of horizontal gating pulses from the pulse generator 86, as shown in FIG. 2*i*.

The AND gate or logic 92 produces appropriately timed horizontal synchronizing pulses, as shown in FIG. 2*j*, which are fed to an input of an OR logic gate 102. The other input to the OR gate 102 is the synchronizing pulse output from the synchronizing pulse stripper 76, which has no signal output during the dropout interval. Thus, the output from the OR gate 102 on lead 104 is an appropriately timed, noise-free composite synchronizing signal which is then fed to the amplifier 106, and in turn, fed to the main video circuit path 18 through the amplifier output lead 108.

Considering now the video signal in the main channel 18, taken at the lead 60 (illustrated in FIG. 2*h*), this signal is fed through the emitter-follower 74 to a delay circuit 110 for delaying the signal in the main channel 18 for a duration of time corresponding to the delay caused by the low-pass filter 75. The video signal in the main channel 18 is delayed so that time coincidence of the signals following each of these parallel paths is maintained. It has been found in one embodiment of the present system, that a 0.6-microsecond delay introduced by the delay circuit 110 is suitable to achieve the requisite coincidence for proper combining of the new synchronizing signals to the signals in the main video channel 18, as will now be discussed.

The output of the delay circuit 110 is fed directly to a chroma separator circuit 112. The chroma separator circuit 112 separates the color signal or color burst from the composite signal, the color burst being provided on output lead 114, and the remainder of the signal being provided on output lead 116. The video signal from lead 116 is amplified by the video amplifier 118 and thereafter fed to a clipper 120 which clips all portions of the signal lower than the black level. Thus, the output from the clipper 120 contains essentially only the video intelligence signal which is fed to an adding circuit 122. The color signal or color burst from the chroma separator 112 is supplied via lead 114 to the adder 122 where it is recombined with the video intelligence signal from the clipper 120. As can be seen, the chroma separator 112 serves to bypass the color signal around the clipper 120 to prevent its destruction. In addition, the output from the composite synchronizing pulse amplifier 106 is also fed to the adder 122 wherein it is combined with the other signals. Consequently, the output from the adder 122 on lead 124 is a composite video signal which is then fed through a 4.4-megacycle low-pass filter 126 to remove any remaining high-frequency noise that might be present on the composite signal.

The output from the low-pass filter 126 is amplified by an output amplifier 128, and supplies the completely processed composite video signal to the output terminal means 17.

As can be seen, the system, in addition to providing the normal video processing, provides the horizontal synchronizing signal during the dropout interval which is otherwise maintained at the black level, or other level such as a grey scale, and utilizes only the signal from a single transducing head to this end. The same video signal that enters the main signal channel 18 of the system provides the control signal source for determining the dropout position and duration. The dropout position is initially set by suitable adjustment of the dropout position multivibrator 52 to produce the pulse 54 terminating just prior to the dropout occurrence, so that the total time from each vertical synchronizing pulse to the commencement of each dropout interval is predetermined by the combined duration of the first vertical delay pulse 40, the amplifier pulse 50 and the dropout position pulse 54.

The duration of each dropout interval is then predetermined by the width of the dropout width pulse 56, which is suitably adjusted to be slightly greater than the dropout interval. The dropout width pulse controls the clamping of the video signal in the main channel 18 to a fixed level (FIG. 2*h*), the insertion of horizontal synchronizing pulses during the dropout interval (FIG. 2*j*), and the inhibiting of noise which might otherwise pass into the control circuit.

The reinsertion timing of the processed vertical synchronizing signal into the main video channel is predetermined by the combined duration of the first and second vertical delay pulses 40 and 86, which provide a total delay time of approximately one field, or a period extending from one vertical synchronizing pulse to about the first equalizing pulse of the next succeeding vertical synchronizing pulse interval, and these delay circuits are adjusted accordingly. The vertical gating pulse 90 is generated on the termination of this delay and has a pulse width which is generally coextensive with the vertical pulse interval (FIGS. 2*g* and *h*).

The reinsertion timing of the processed horizontal synchronizing signal is predetermined by the horizontal gating pulses shown in FIG. 2*i* which are generated in response to the stripped horizontal synchronizing pulses, and are adjusted to be slightly wider than the signal-synchronizing pulses. Therefore, when these gating pulses control the stripping and reinsertion of the horizontal synchronizing pulses through the stripper 76 and its associated circuits, the undesirable components adjacent the pulses, as shown in FIG. 3, are effectively prevented from appearing in the reconstructed or processed composite video signal.

TENSION CONTROL SYSTEM

In accordance with this aspect of the present invention, the signal dropout interval in the modulated carrier on the magnetic tape is detected and utilized to advantage in controlling the tension on the magnetic tape to maintain it essentially constant, while employing only the demodulated composite video signal, itself, for this purpose.

Figure 4:
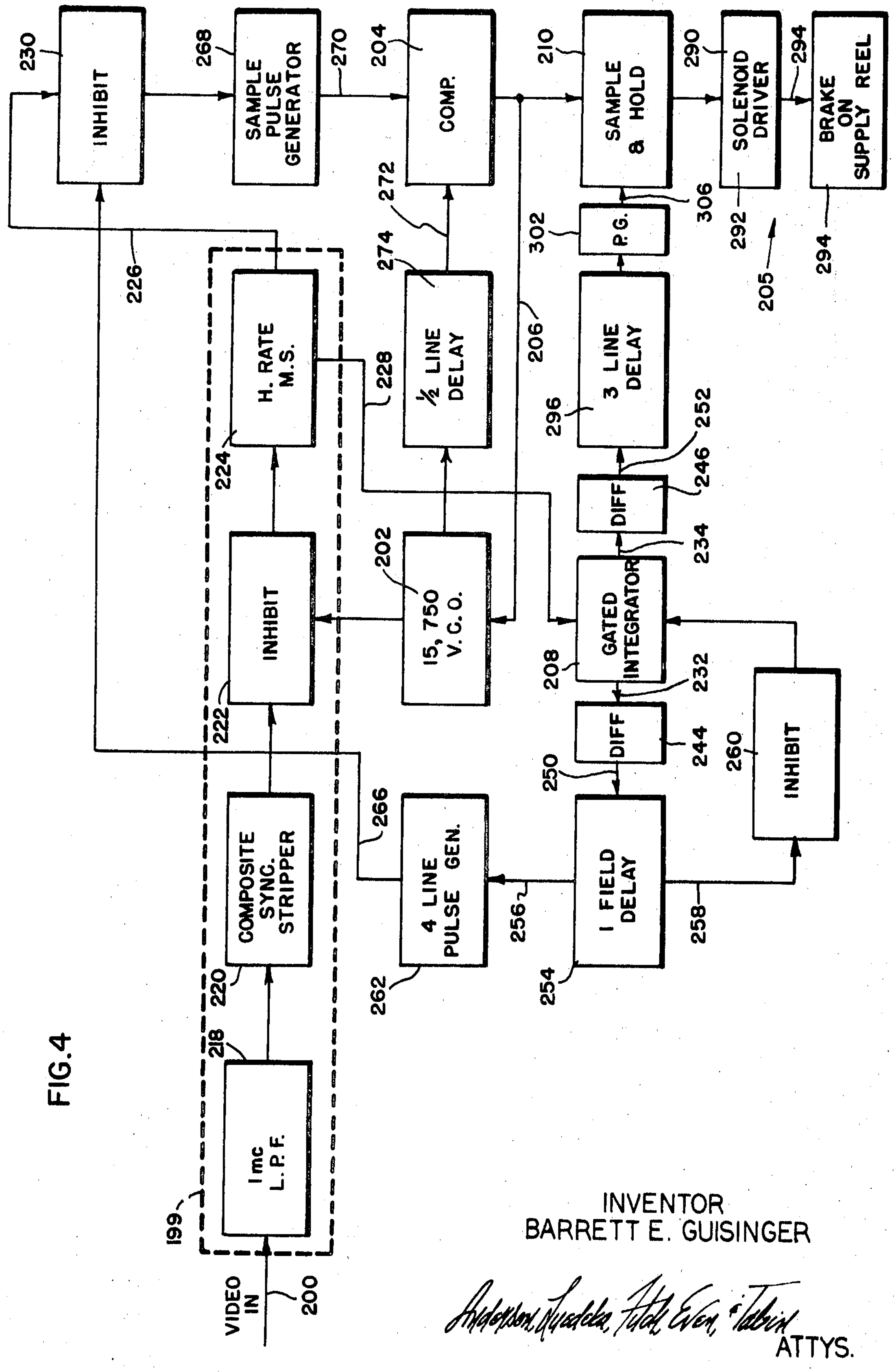
FIG. 4 is a block diagram of a video tape tension servo system employing a dropout detector in accordance with another embodiment of the present invention.

Referring now to FIG. 4, there is shown one embodiment of a system for controlling the tension of a magnetic recording tape having a composite video signal modulated carrier thereon and a dropout interval occurring in each video field. In general, this system comprises circuit means 199, the components of which are hereinafter described, which is responsive to the demodulated composite video signal at the input terminal 200, and produces an output signal that is indicative of the horizontal synchronizing pulses in the input signal and also the absence of such pulses during the dropout interval; a controlled oscillator 202 which normally generates output pulses at the average horizontal synchronizing pulse rate; and comparison means 204 which receives the output of circuit means 199, corresponding to the input horizontal synchronizing pulses, an which also receives the output signal from the controlled oscillator 202. Upon comparing these two signals, the comparing means 204 produces an error signal which is indicative of the phase difference therebetween. Feedback coupling means 206 is provided which couples the error signal from the comparison means 204 to the controlled oscillator 202 to alter the output thereof by reducing the error signal from the comparison means 204 to a predetermined reference value. No horizontal synchronizing pulses are, of course, fed to the comparison means 204 during the dropout interval, but the controlled oscillator maintains its output during the dropout interval essentially as it was just prior to the dropout interval, so that the error signal produced by the comparison means 204 is indicative of the phase change between (1) the horizontal synchronizing pulses of the video signal just prior to the dropout interval and (2) the horizontal synchronizing pulses of the video signal just after the dropout interval, at which time the horizontal synchronizing pulses from the input video signal are again supplied to the comparison means 204. Consequently, the error signal output of the comparison means 204 provides an indication of the changes or variations in the tension of the tape medium, and tension control means 205 is provided which is responsive to the error signal, and which maintains the tape tension at a constant value.

The tension control or servosystem in accordance with the embodiment shown in FIG. 4 includes dropout-detecting means, illustrated in the present embodiment as a gated integrator circuit 208, which is coupled to an output of the circuit means 199 and is responsive to the absence of horizontal synchronizing pulses for some specified period of time, or for a period greater than a predetermined time, to produce an output signal indicative of the presence and termination of the dropout interval. Sampling means, illustrated as a sample-and-hold circuit 210, is responsive to the dropout-detecting means output and to the error signal from the comparison means 204, and provides a sample of the error signal at a predetermined time after the termination of the dropout interval to assure that the sampled signal is a reliable indication of the variation in tape tension, even though the dropout interval may have ended during a horizontal synchronizing pulse.

Figure 5:
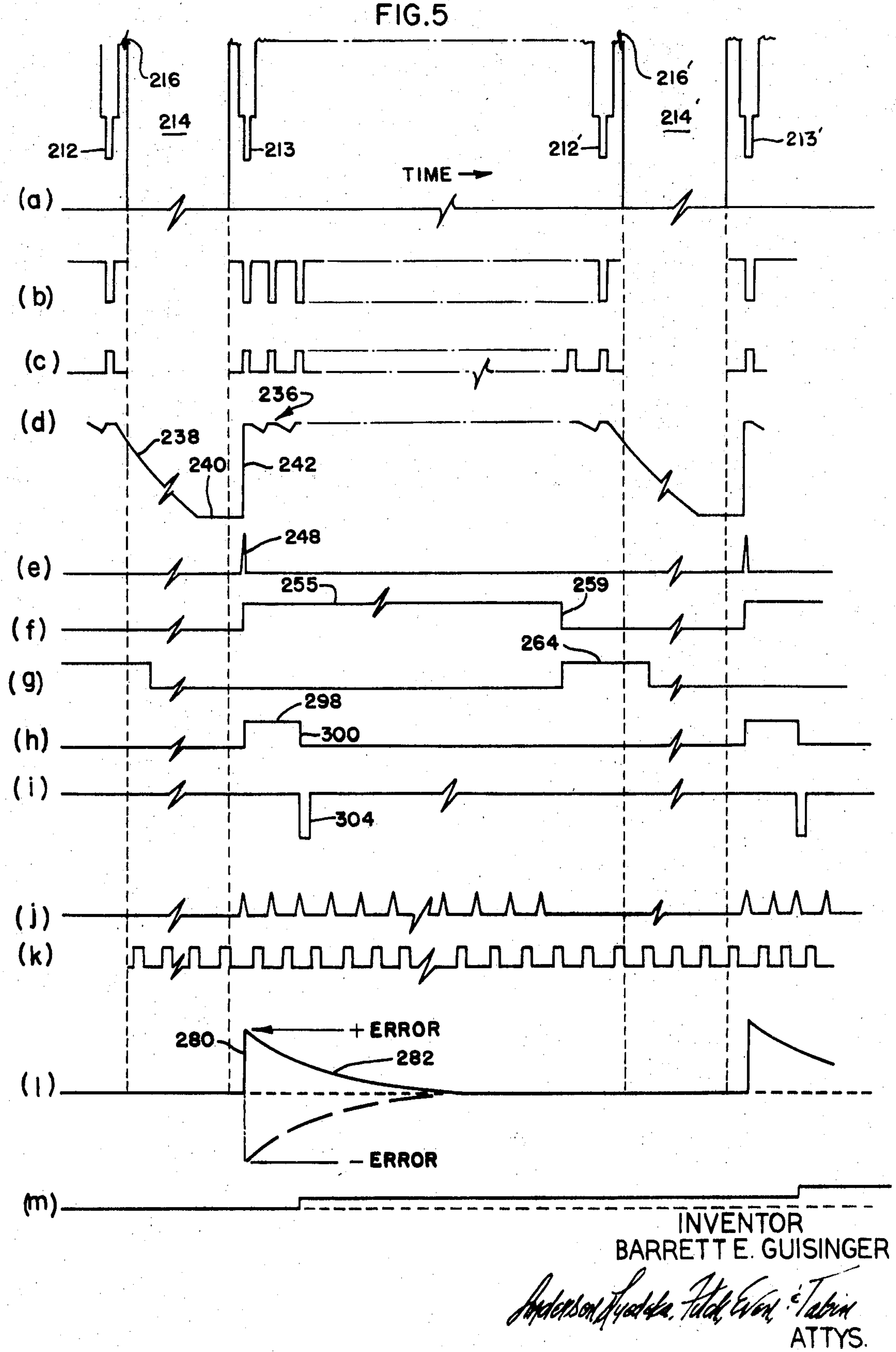
FIG. 5 is a series of graphical representations (*a* ) through (*m*) of the voltage waveforms occurring at various points of the system shown in FIG. 4 to illustrate the operation thereof.

More particularly, the signal which may be applied to the input terminal 200 is shown in FIG. *5a*, and is a graphical representation of portions of the demodulated composite video signal of interest, showing the last horizontal synchronizing pulse 212 occurring just before the dropout interval 214 and the first horizontal synchronizing pulse 213 occurring just after the dropout interval. The presence of noise on the leading edge of the dropout interval is indicated generally as 216. Likewise, a signal waveform is shown at a later time which represents the video signal during the period just prior to and just subsequent to the next succeeding dropout interval in the next succeeding video field, wherein the corresponding portions of the diagram are indicated by primed reference numerals. For convenience of illustration, the abscissa or time coordinate of the graphical representations in FIG. 5 are not continuous or to scale; however, the video signal illustrated in FIG. *5a* has the standard characteristics of such a signal, namely, a horizontal synchronizing pulse rate of 15,750 pp.s. and a vertical synchronizing pulse rate of 60 p.p.s., and is well known to those skilled in the art. The signal produces two fields per video frame and has the dropout interval occurring near the end of each video field just prior to the vertical synchronizing pulse interval, although it may occur elsewhere instead. The dropout interval may commonly have a duration of 8 to 10 lines, which is represented by the dropout intervals 214 and 214' in FIG. *5a*. Also, there are, of course, 262½lines between the two fields shown, as is standard for odd-line interlaced scanning, although the principles of the present invention are not limited to this particular form of video signal.

The input signal, as above described, is fed through a 1-megacycle low-pass filter 218 which blocks any high-frequency noise which might be present in the signal. The filtered signal is then fed to a stripper circuit 220 which provides an output of only the composite synchronizing pulses. The output of the stripper circuit 220 is coupled to the input of an inhibit gate 222 which is controlled by an output signal from the controlled oscillator 202 so that the inhibit gate 222 is open only for the periods of the horizontal synchronizing pulses, and is otherwise closed to prevent noise from passing therethrough. The horizontal synchronizing pulses from the inhibit gate 222, as illustrated in FIG. *5b*, are fed to a monostable multivibrator 224 which is thus triggered at the horizontal pulse rate, and the noise which might otherwise have caused spurious triggering is blocked by the inhibit gate 222. The horizontal-rate multivibrator 224 provides pulses, illustrated in FIG. *5c*, on two output leads 226 and 228, which constitute the output signals from the circuit means 199 in the illustrated embodiment. The output lead 226 is coupled to the input of a further inhibit gate 230, while the other output lead 228 provides gating pulses for controlling the gated integrator 208 which detects the termination of each dropout interval.

The gated integrator 208 receives each of the pulses from the horizontal-rate multivibrator 224, corresponding to each of the horizontal synchronizing pulses in the input video signal, and provides an output on each of the leads 232 and 234 corresponding to the signal shown in FIG.*5d*. As can be seen from FIG. *5d*, the outputs on leads 232 and 234 have a normally periodic waveform of decreasing potential which, on the occurrence of each horizontal-rate pulse, is restored to its original or reference value, producing a generally sawtooth-type waveform 236. However, on the occurrence of the last horizontal synchronizing pulse 212 prior to the dropout interval 214, the output potential from the gated integrator 208 continues to decrease (or increase, depending on the reference used), as shown at 238, until it becomes relatively flat at 240. This type of characteristic is somewhat exemplary and may be produced by the charging or discharging of a capacitor employed in the gated integrator circuit 208 or in any other suitable manner. On the occurence of the first horizontal synchronizing pulse 213 after the dropout interval, and the corresponding horizontal rate pulse, the output signal of the gated integrator 208 is abruptly restored to its reference value, as shown at 242 in FIG. *5d*. This may be produced, of course, by merely causing the output from the horizontal-rate multivibrator 224 to restore the initial circuit conditions to the capacitor within the gated integrator 208 on the occurrence of a pulse on lead 228. Other manners of providing such a characteristic output from the gated integrator 208 may of course be employed, and various circuits, known per se, may be employed for this purpose.

The outputs 232 and 234 from the gated integrator 208 are each fed to differentiating circuits 244 and 246, respectively. Each of the differentiating circuits 244 and 246 produce an output pulse, as shown in FIG. *5e*, which is a voltage spike or pulse 248. The pulse 248, is of course, produced upon the abrupt restoration of the gated integrator output to its reference level, as shown at 242 in FIG. *5d*. The differential pulse 248 is produced on the output leads 250 and 252 from the differentiating circuits 244 and 246 respectively, and each performs a different function in the system, now to be described.

The spike or pulse output on lead 250 from the differentiating circuit 244 is fed to delay means 254, which may comprise a monostable multivibrator, to produce a relatively long output pulse 255 on output leads 256 and 258, as shown in FIG. *5f*. This output pulse preferably extends for a period of about 14 lines less than one standard field, after which it terminates in the trailing edge 259. Or in other words, this pulse preferably has a width of about 248½lines which brings the trailing edge 259 within approximately two lines of the beginning of the next succeeding dropout interval.

The output on lead 258 from the delay means 254 triggers an inhibit circuit 260 which feeds back an inhibit signal to the gated integrator 208 to prevent the integrator from producing the output signal 238 (FIG. *5d*) until the next succeeding dropout interval occurs. Thus, the inhibit circuit 260 maintains the gated integrator output as the generally sawtooth waveform 236, or off, at all times except during the periodic dropout intervals, and the differentiators 244 and 246 produce output pulses 248 (FIG. *5e*) only after each such interval. This prevents other or spurious dropouts which might occur, for example, due to tape defects, from causing erroneous sampling.

The output pulse 255 on lead 256 from the delay circuit 254 triggers a pulse generator 262 on the trailing edge 259 to produce a pulse 264 (FIG. *5g*) on lead 266, which has a duration of 4 horizontal lines, and thus extends into the succeeding dropout interval 214'. Output pulse 264 from the pulse generator 262 has its leading edge approximately coincident with the trailing edge 259 of the field delay pulse 255, about 2 or 3 lines prior to the dropout, and its trailing edge falling about 1 or 2 lines within the dropout. Consequently, pulse 264 controls the inhibit gate 230 so that it will block the output of the horizontal-rate pulse generator 224 for a time before and into the dropout interval, and thus further assures that noise generated pulses, or other undesirable components, indicated generally as 216 and 216', are prevented from passing to the comparator 204, which would degrade the integrity of the error signal and oscillator output.

At all other times, the horizontal-rate pulses from lead 226 pass through the inhibit gate 230 and trigger a sample pulse generator 268 which generates sampling pulses as shown in FIG. *5j*, each corresponding to one of the horizontal-rate pulses supplied to the generator 268. The sampling pulses from generator 268 are fed to the phase comparator 204 via lead 270 which also receives another input on lead 272, shown in FIG. *5k*, which is derived from the voltage-controlled oscillator 202 after being delayed one-half line by a delay circuit 274.The output pulses from the one-half line delay 274 are at the horizontal rate and shifted approximately 180° out of phase with respect to the sampling pulses on lead 270, the actual phase difference between these pulse trains from the 180° figure producing the DC error voltage output from the comparator 204 on lead 206. The error voltage on lead 206 is then fed to the voltage controlled oscillator 202 in a feedback arrangement so that the frequency of the oscillator is slowly changed in the direction to minimize the error voltage, the oscillator having a relatively long time constant.

More specifically, the DC error voltage from the phase comparator 204 is illustrated in FIG. 5*L* and is indicative of the magnitude and direction of any deviation in the tension of the tape which is produced by either becoming somewhat longer or shorter due to variations in the amount of stretch, temperature change, etc., of the tape. This change in tape length manifests itself as a generally small shift or deviation of the horizontal synchronizing pulse rate, becoming slightly higher when the tape is shortened and slightly lower when the tape is lengthened. The deviation in horizontal synchronizing pulse rate may be detected as a change in phase of the pulse train from one time to another. Thus, assuming that the initial tension is adjusted so that the error voltage from the phase comparator 204 is initially zero or "no-error" reference, and the initial phase of the variable-controlled oscillator 202 is taken as a reference, if the horizontal synchronizing pulse rate of the input video signal changes, the first horizontal synchronizing pulse which passes through the inhibit gate 230 after the dropout interval will be out of phase with the pulse train produced by the oscillator 202 which had its phase fixed just prior to the dropout interval and which maintains this initial phase over the dropout interval. On the occurrence of the horizontal synchronizing pulse 213 just after the dropout 214, the error voltage will have an abrupt change 280 (FIG. 5*L*) if there was any change in tape length from that prior to the dropout interval. This portion of the signal, then, represents the magnitude of the tension error; its polarity, i.e., whether it is above or below the reference level, represents the sense of the error, or whether the tape is short or long. As shown in FIG. 5*l*, the solid line represents a positive error, indicating that more tension is required, while the dotted line represents a negative error, indicating that less tension is required, to maintain a constant tape stretch.

Thus, the phase of the horizontal synchronizing pulses in the input video signal during the period just after a dropout interval is always compared to the phase of the horizontal synchronizing pulses that occurred prior to the dropout interval, and this comparison reflects any change in tape length that may have occurred. The DC error voltage on lead 206 may change abruptly each time the first horizontal synchronizing pulse after a dropout interval triggers the sample pulse generator 268 to supply a sampling pulse to the phase comparator 204. Thereafter, during the remainder of the field, the DC error voltage gradually diminishes to its reference level as the oscillator 202 shifts the phase of its output pulse train, as shown at 282 in FIG. 5*l*.

The sample-and-hold circuit 210 is responsive to the DC error voltage from the comparator 204 and causes the sampling thereof which derives an output signal (FIG. 5*m*) on lead 290 in the form of a varying DC, the variations of which are determined by the magnitude and polarity of the tension error. This DC supplies a solenoid driver 292 which applies a varying braking force on the tape supply reel, schematically indicated as block 294, to offset of compensate for the variations in tape tension detected.

The differentiated output 252, which generates the sampling pulse for the sample-and-hold circuit 210 in response to the dropout signal, is coupled to a delay circuit 296 which produces an output pulse 298 (FIG. 5*h*) which has a duration of three horizontal lines. The three-line delay circuit 296 may comprise a monostable multivibrator to produce the pulse 298, and the trailing edge 300 thereof triggers a sample pulse generator 302 to produce the pulse 304 (shown in FIG. 5*i*) on lead 306. Pulse 304 occurs on the third horizontal line after the dropout interval and samples the DC error voltage from the comparator 204 at this time. Consequently, erroneous sampling due to the possibility of the dropout position shifting and terminating during a horizontal synchronizing pulse is prevented, the tension error indication being taken at a predetermined time after the termination of the dropout on the error voltage portion 282, rather than on the portion 280.

The magnitude of the direct-current output to the solenoid driver 292 on lead 290 is determined and redetermined at each sampling of the error voltage by the sampling pulse on lead 306, and may produce a stepped current as shown in FIG. 5*m*. The amount of current supplied to the driver 292 determines the amount of braking force applied to the tape supply reel, and hence, the tension applied to the tape.

The construction of the solenoid driver, brake, tape mechanism, etc., are known to the art, and their constructions do not, in themselves, form a part of the present invention.

VIDEO PROCESSING AMPLIFIER—II

Figure 6:
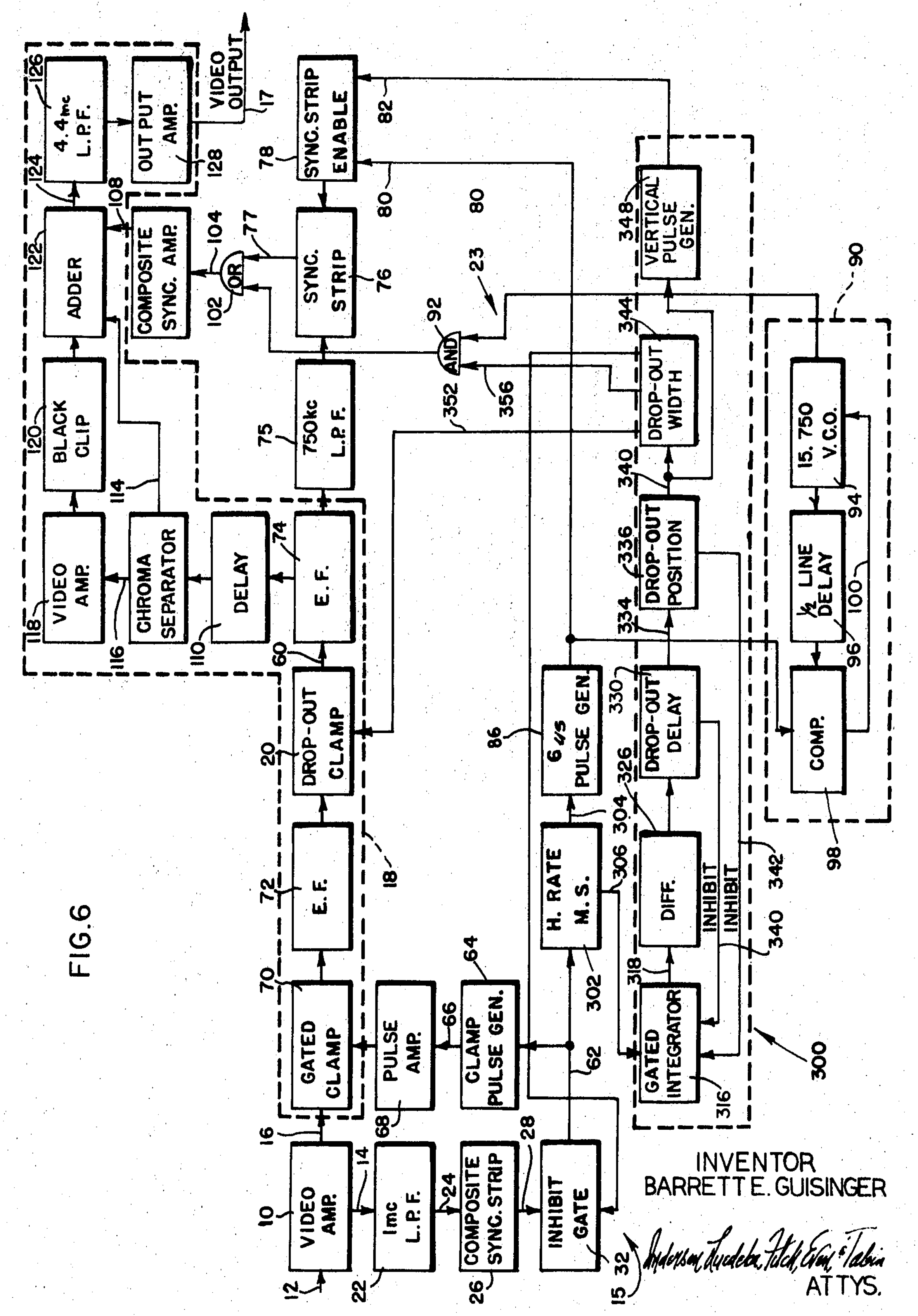
FIG. 6 is a block diagram of a video processing amplifying system employing a dropout-detecting system in accordance with a further embodiment of the present invention.

Referring now to FIG. 6, there is shown a video processing system in accordance with a further aspect of the present invention for determining the position and duration of the dropout intervals in the reproduction of a composite video signal modulated carrier from a magnetic record medium and the processing of the demodulated video signal in a manner similar to that described in connection with the embodiment of FIG. 1; however, in the present embodiment, the presence of the dropout interval in each field of the video signal is itself detected and the indication derived from the presence of the dropout interval is utilized to control the processing amplifier in such a manner as to obviate the deleterious effects caused by the presence of these dropout intervals.

The video processing amplifier illustrated in FIG. 6 has those components corresponding to those of the embodiment shown in FIG. 1 indicated with the same reference characters, and the system generally comprises a video amplifier 10 which receives the demodulated composite video signal through the input lead 12 and provides an amplified version of the input on each of the two output leads 14 and 16. The amplifier output lead 14 provides the signal for the control circuit means, indicated generally as 15, constituting the signal control path of the system, while the amplifier output on lead 16 provides the signal for the main circuit means, generally indicated as 18, constituting the main or primary signal path or channel of this system to the output terminal means 17.

The control circuit means 15 includes dropout signal means, indicated in dotted line as 300, for providing a signal indicative of the position and duration of the dropout interval in the input video signal based on the absence of horizontal synchronizing pulses for a period greater than a predetermined time interval, and in this manner, the dropout interval is detected and a signal indicative thereof is provided for appropriate control of the video processing amplifier. As in the embodiment of FIG. 1, the main circuit means 18 includes a controllable clamping means 20 in the main signal path which is responsive to the dropout signal means 300 which clamps the output of the clamping means 20 to a predetermined level such as the black level, during the period of the dropout interval, but otherwise passes the video signal therethrough to the output terminal means 17. The control circuit means 15 further comprises pulse-inserting means 23, which is similar to that of the embodiment of FIG. 1, and which inserts suitable horizontal synchronizing pulses in the video signal of the main circuit path 18 during the dropout interval to provide optimum picture stability. The pulse-inserting means 23 is controlled by the dropout signal means 300 in a manner to be described in detail hereinafter. Additional system circuits are provided which are also similar to those described in connection with FIG. 1 and are employed for eliminating the noise normally occurring just prior to and during the dropout interval and for preventing this noise from impairing the functioning of the control circuit means 15, including the dropout signal means 300, as well as for providing stripping, processing, and reinsertion of the synchronizing pulses, and also for eliminating the transmission of undesirable frequency components to the output terminal 17.

Considering now the system of FIG. 6 with greater particularity, the video amplifier output on lead 14 is passed through a 1-megacycle low-pass filter 22 and through a composite synchronizing-pulse stripping circuit 26 for providing an output on lead 28 of only the composite synchronizing pulses. These pulses are transmitted through the normally open controllable inhibit gate 32 to the output lead 62 thereof. Since the embodiment of FIG. 5 references the dropout intervals to the horizontal synchronizing pulses rather than the vertical synchronizing pulses as in the embodiment of FIG. 1, the necessity for employing a further vertical synchronizing pulse stripper as there shown, is generally eliminated.

The output 62 from the inhibit gate 32 in the present embodiment supplies the control basis for eliminating the presence of noise on the backporch portions of the video signal in the main channel 18, for controlling the processing of the synchronizing pulses, and for detecting the dropout intervals. The first of the foregoing functions is accomplished in the same manner as previously described in connection with the embodiment of FIG. 1, and further discussion here is not considered necessary. As regards the latter two function, the composite synchronizing pulses on the output lead 62 are supplied to the horizontal-rate monostable multivibrator 302, which may be of any suitable type or similar to the horizontal-rate multivibrator 84 of FIG. 1, but having two output leads 304 and 306. The output on lead 304 is identical to the output provided in the FIG. 1 embodiment of the corresponding circuit components and constitutes a series of pulses corresponding to the horizontal synchronizing pulses of the video signal. Such pulses are also provided on the output lead 306 from the horizontal-rate monostable multivibrator 302, and these pulses constitute the input signal to the dropout signal means 300.

Figure 7:
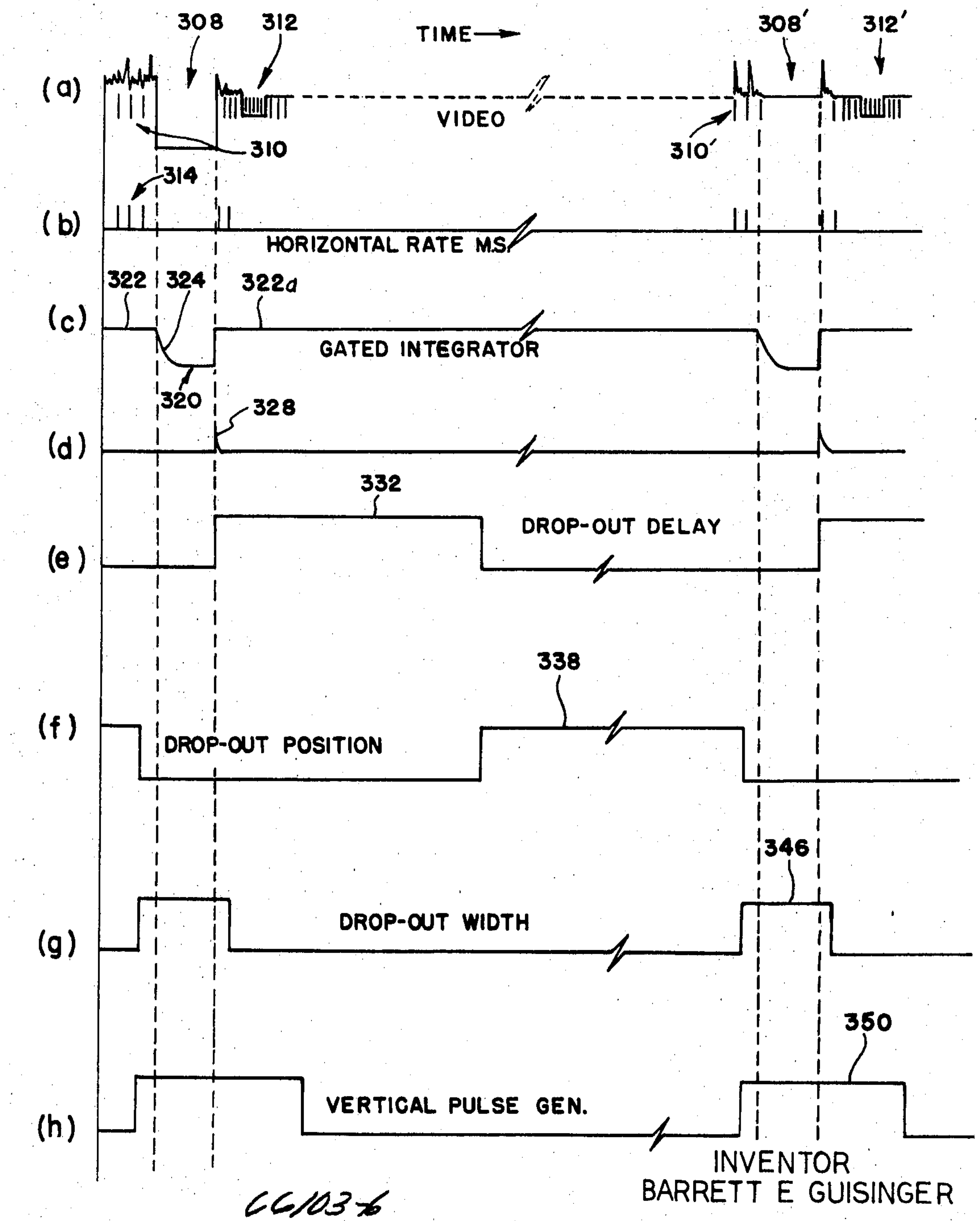
FIG. 7 is a series of graphical representations (*a*) through (*h*) showing the voltage waveforms occurring at various points of the system shown in FIG. 6 to illustrate the operation thereof.

More particularly, the output from multivibrator 302, is a pulse train corresponding to the actual horizontal synchronizing pulses in the video signal, as shown in FIG. 7b. The video input signal to the video amplifier 10 is illustrated generally in FIG. 7a which shows portions of two successive video fields having dropout intervals 308, horizontal synchronizing signals 310 and vertical synchronizing intervals 312, the corresponding portions of the signal in the second field being indicated by the same reference characters but primed. As generally shown in FIG. 7a, the input signal has a substantial amount of noise and other undesirable frequency components. This signal is passed through the filter 22 and the stripper 26, and the composite synchronizing signals provided on output lead 62 are fed to the multivibrator 302. The horizontal-rate pulses 314, illustrated in FIG. 7b, are generated on lead 306 on a one-to-one correspondence with the horizontal synchronizing pulses and supplied to the dropout signal means 300, and specifically, as an input to a gated integrator circuit 316. Since the multivibrator 302 produces an output only in response to an input pulse, no output pulses 314 are produced or generated during the dropout intervals.

The gated integrator circuit 316 may be of the same types as described in connection with the gated integrator circuit illustrated in FIG. 4 and employed in the tension control system thereinshown. Likewise, the gated integrator 316 has substantially the same output characteristics as that shown in FIG. 5b, and in the present embodiment the output of the gated integrator 316 is provided on lead 318 and is illustrated in FIG. 7c as signal 320. As can be seen from FIG. 7c, the gated integrator output on 318 is maintained at its reference value or level 322 or "off" by the occurrence of the horizontal-rate pulses 314 at regularly spaced and normal intervals; that is, within periods less than some predetermined time. However, during the dropout interval 308, where there is an absence of horizontal-rate pulses 314 to the gated integrator, the output 318 begins to deviate slowly from the reference level 322 as shown by 324 in FIG. 7c. On the reoccurrence of the first horizontal synchronizing pulse after the dropout interval, a horizontal-rate pulse is again supplied to the gated integrator 316 which causes the same to abruptly return to the reference level, illustrated as 322a, and this abrupt voltage change is differentiated by a differentiating circuit 326 to produce an output spike 328, as shown in FIG. 7d. This output spike 328 triggers dropout delay circuit 330 which may be a conventional monostable multivibrator, for generating a dropout delay or extended pulse 332, as shown in FIG. 7e. Dropout delay pulse 332 has its leading edge coincident with the spike 328 and also approximately with the termination of the dropout interval. Consequently, the dropout delay pulse 332 will be generated at the actual termination of each dropout interval in each successive video field. The pulse 332 supplied on output lead 334 is fed to a dropout position circuit 336, which may also be of any suitable type such as a monostable multivibrator, for providing a second extended pulse 338 on output lead 340. The dropout position circuit 336 generates the dropout position pulse 338 on the trailing edge of the dropout delay pulse 332, and it is the trailing edge of the latter pulse which activates the dropout position circuit 336. Both the dropout delay circuit 330 and the dropout position circuit 336 provide inhibit signals on leads 340 and 342, respectively, to the gated integrator circuit 316 so that the gated integrator is inhibited or maintained in its "off" condition during substantially the entire remaining portion of the video field. This provides assurance that the gated integrator will only respond to the regular or periodic dropout interval in each video field and not to other "dropouts" caused, for example, by latent tape defects, etc.

The dropout position pulse 338 is preselected to be of such length that, combined with the length of the dropout delay pulse 332, the trailing edge falls just prior to the next successive dropout interval as shown in FIG. 7f. The termination or trailing edge of the dropout position pulse 338 serves generally three functions. First, upon termination of this pulse, the inhibit signal on lead 342 to the gated integrator 316 is removed to permit the gated integrator to respond to the next succeeding dropout interval 308′. Second, the trailing edge of pulse 338 triggers the dropout width circuit 344 which, in turn, produces a pulse 346 of predetermine duration which is slightly wider than the dropout interval but approximately coextensive therewith as shown in FIG. 7g. Third, the trailing edge of the dropout position pulse 338 is coupled to and triggers the vertical pulse generator 348 which produces a gating pulse 350, illustrated in FIG. 7h, which is supplied via lead 82 to the synchronizing pulse strippers enable circuit 78 which may operate in a manner similar to that of the corresponding enable circuit of the FIG. 1 embodiment.

The dropout width circuit 344 which produces the dropout width pulse 346 which produces the dropout width pulse 346 performs three particular functions in the system with this pulse; namely, a first output is provided via lead 352 to the dropout clamp circuit 20 to clamp the signal in the main video channel 18 to a predetermined level, such as the black level previously mentioned; a second output is provided from the dropout width circuit 344 via lead 354 to the inhibit gate 32 to cause the closing thereof from a time just prior to the dropout interval to just after the dropout interval so as to prevent noise pulses generally present in this region from passing through the control circuit means 15 and disturbing the normal operation thereof; and a third output from the dropout width circuit 344 is provided via lead 356 to the AND logic gate 92 so that the newly generated synchronizing pulses from the oscillator circuitry 90 will pass to the OR logic gate 102 for reinsertion into the video signal only during the dropout interval.

The dropout position pulse 338 on lead 340 also activates the vertical pulse generator 348, which produces a pulse 350, as shown in FIG. 7h, extending from just prior to the dropout interval to a time just subsequent to the occurrence of the vertical synchronizing interval 312′. Pulse 350 is fed to the synchronizing pulse stripper enable circuit 78 via lead 82 which enables the synchronizing pulse stripper 76 during this period. Thus, although the stripper 76 is enabled prior to the dropout interval, no signal is fed thereto because the dropout width pulse 346 causes the dropout clamp circuit 20 to clamp the main video signal at 60 to a predetermined fixed level during the dropout. After the dropout interval the vertical synchronizing interval occurs, and the stripper, being preenabled, strips this signal for reinsertion to the main video as has been previously described.

Other connections or timing arrangements for the vertical pulse generator 348 may alternatively be provided where the dropout interval is positioned other than just before the vertical synchronization interval, and such modifications are within the skill of the art based on the teachings hereof.

The remainder of the circuit operates in a manner generally identical to the system of FIG. 1, and has already been described in connection with the embodiment illustrated in that FIG.

As can thus be seen, the dropout intervals appearing in the video signal are detected by the dropout signal means shown in FIGS. 4 and 6, and those dropout intervals which appear regularly one field apart, may be precisely determined as to position with respect to a given region of the video signal, with respect to time on an absolute basis, or with respect to a given reference signal, and distinguished from other dropouts which may occur by suitable delay means providing inhibit signals which generally span the regular period of interest.

The various circuits, per se, generally illustrated in block form in FIGS. 1, 4 and 6 are known to the art, and are thus not described in great detail. Likewise, it is understood that various specific circuit configurations may be used to perform the functions of the illustrated block components.

Although several embodiments of the various features of the present invention are herein described, various modifications will be apparent to those skilled in the art based on the teachings thereof. Accordingly, the scope of the present invention should be defined only by the appended claims, and equivalents thereof.

Various features of the invention are set forth in the following claims.

I claim:

1. A video processing system for use in the reproducing circuit of a video tape-reproducing apparatus which supplies a composite video signal having periodic signal dropout intervals to the input of the system, comprising main circuit means responsive to the video signal for providing a main signal path for said system, including output terminal means for deriving a processed signal control circuit means also responsive to the same video signal for providing a signal control path for said system; said control circuit means including dropout signal means for providing a signal indicative of the position and duration of the dropout interval of the video signal, said control circuit means including synchronizing pulse stripping means responsive to the video signal and having means for providing only vertical input synchronizing pulses to said dropout signal means, said dropout signal means comprising delay means responsive to the output of said synchronizing pulse stripping means for providing a signal at a predetermined time after each vertical synchronizing pulse, and dropout position means responsive to said signal to derive a pulse indicative of the position of the dropout interval with respect to the previous vertical synchronizing pulse; said main circuit means comprising controllable means in the main signal path responsive to the signal provided by said dropout signal means for providing a video output which is fixed at a predetermined level for the period of the dropout interval but otherwise permits the video signal to pass therethrough to the output terminal means.

2. The system of claim 1 wherein said synchronizing-pulse stripping means comprises means for providing the horizontal synchronizing pulses from the input signal, and wherein said main circuit means comprises a gated clamping means in the main signal path adapted to receive the input video signal and responsive to the horizontal synchronizing pulses from said stripping means for clamping the backporch portions of the signal to a fixed level.

3. The system of claim 1 wherein said dropout signal means further comprises pulse width determining means responsive to the dropout position means for providing a pulse to said controllable means in the main signal path having a duration approximately coextensive with the dropout interval.

4. The system of claim 1 wherein said dropout signal means comprises pulse width determining means responsive to the pulse derived by said dropout position means for providing a pulse output having a pulse width approximately coextensive with the dropout interval, and wherein said control circuit means comprises pulse inserting means responsive to the signal provided by said dropout signal means for inserting horizontal synchronizing pulses in the signal of the main circuit means during the dropout interval.

5. The system of claim 4 further comprising an inhibit gate connected in said control circuit path between the input and said vertical synchronizing-pulse stripping means and responsive to the output of said pulse width determining means for blocking said control circuit means during the dropout interval, whereby noise signals are prevented from passing through the system.

6. The system of claim 4 comprising second delay means responsive to the output of said vertical delay means for controlling the reinsertion of vertical synchronizing signals into the signal of the main circuit means.

7. The system of claim 4 wherein the output pulse of the pulse width determining means is slightly greater than the dropout interval and extends from a time just prior to a time just after said interval.

8. The system of claim 1 wherein said pulse-inserting means comprises controlled oscillator means providing properly phased pulses at the horizontal synchronizing rate, and logic means responsive to said controlled oscillator means and to said pulse width determining means for providing pulses at the horizontal synchronizing rate only during the dropout interval, and means for adding said pulses to the signal of the main circuit means.

9. The system of claim 8 wherein said logic means comprises an AND gate, said pulse-inserting means further comprising an OR gate having one input coupled to the output of the AND gate and another input coupled to a source of stripped synchronizing pulses from the input signal.

10. The system of claim 4 wherein said controllable means comprises clamping means responsive to the pulse output of said pulse width determining means for clamping the signal of the main signal means to said predetermined level during each dropout interval.

11. The system of claim 10 further comprising clipping means coupled to the output of said clamping means for removing all portions of the video signal of a lower level than the black level, means for generating vertical synchronizing pulses and horizontal synchronizing pulses in synchronism with the original composite synchronizing pulses, and means for adding the generated synchronizing pulses to the output of said clipping means.

12. The system of claim 11 further comprising chroma separator means coupled between said clamping means and said clipping means, and means for shunting the chroma portions of the video signal around the clipping means to said adding means.

13. The system of claim 4 wherein said synchronizing-pulse stripping means comprises further means for providing the horizontal synchronizing pulses from the input signal, the system further comprising gating-pulse generator means responsive to the horizontal synchronizing pulses for producing gating pulses at the horizontal synchronizing rate having a pulse width slightly greater than the horizontal synchronizing pulses, controllable stripping means responsive to the signal of the main signal means and to said gating pulses for providing a synchronizing pulse output substantially free of undesirable components normally adjacent the stripped synchronizing pulses.

14. The system of claim 13 further comprising logic means responsive to the output of said controllable stripping means and said pulse inserting means to provide synchronizing pulses during the dropout interval as well as otherwise, and means for adding said pulses to the signal of the main circuit means.

15. The system of claim 14 wherein said logic means comprises an OR gate.

16. A system for controlling the tension of a magnetic tape in a video tape recorder, said tape having thereon a carrier modulated by a composite video signal which modulated carrier has a dropout interval in each video field, said video tape recorder having means therein to demodulate said modulated carrier to supply the composite video signal with the dropout interval to the input to said system, said system comprising a controlled oscillator for generating output pulses at a normal horizontal synchronizing pulse rate; circuit means responsive to the composite video signal for producing an output indicative of the horizontal synchronizing pulses in said video signal and the absence of such pulses during the dropout interval; comparison means responsive to the horizontal synchronizing pulses from said circuit means and to the output of said controlled oscillator for producing an error signal indicative of the phase difference therebetween; means coupling the error signal to said controlled oscillator for slowly altering the output thereof to reduce the error signal from said comparing means to a predetermined value; said oscillator maintaining its output during the dropout essentially as it was just prior to the dropout so that the error signal is indicative of the phase change between the horizontal synchronizing pulses of the video signal just prior to the dropout interval and just after the dropout interval, to thereby provide an indication of changes in the tape tension; dropout detecting means responsive to the absence and then presence of horizontal synchronizing pulses for producing an output indicative of the termination of the dropout interval, and means responsive to said detecting means output for sampling the error signal at a predetermined time after the termination of the dropout interval; and control means responsive to the sampled error signal for maintaining the tape tension constant.

17. Video magnetic tape apparatus comprising the system according to claim 16 including a supply reel for supplying the magnetic tape to a takeup reel, said control means including a variable brake on said supply reel responsive to the error signal for applying tension of said tape to maintain a constant tape stretch.

18. The system of claim 16 further comprising inhibiting means for opening and closing the circuit path for the output of said circuit means to said comparing means, and means coupling the output of said detecting means to said inhibiting means to open said circuit path to said comparing means just before and into the subsequent dropout interval.

19. The system of claim 18 wherein the means responsive to the dropout-detecting means output comprises delay means for generating an output signal approximately one field after receiving its input signal, and inhibit means responsive to the delay means output for preventing said dropout-detecting means from producing a new output signal until the succeeding dropout interval.

20. The system of claim 16 wherein said circuit means includes stripping means responsive to the composite video signal for providing an output of only the composite synchronizing signal.

21. The system of claim 20 wherein said circuit means further includes inhibiting means in the signal path responsive to said controllable oscillator output for gating only the horizontal synchronizing pulses through the circuit to prevent the passage of noise therethrough.

22. The system of claim 21 wherein said circuit means further includes a pulse generator responsive to the output of said inhibiting means for producing pulses corresponding to the horizontal synchronizing signal, said system further comprising second inhibiting means in the circuit path from said pulse generator to said comparing means, dropout-detecting means also coupled to said pulse generator and responsive to the absence of horizontal synchronizing pulses for producing an output indicative of the termination of the dropout interval, means responsive to said detecting means output and coupled to said second inhibiting means for opening said circuit path to the comparing means just before and into the subsequent dropout interval.

23. The system of claim 22 further comprising sampling means also responsive to said dropout-deleting means output for sampling the error signal at a predetermined time after the termination of the dropout interval, and means responsive to the sampled error signal for varying the tension on said tape.

24. A video processing system for use in the reproducing circuit of a video tape-reproducing apparatus which supplies a composite video signal having periodic signal dropout intervals to the input of the system comprising main circuit means responsive to the video signal for providing a main signal path for said system, including output terminal means for deriving a processed signal; control circuit means also responsive to the same video signal for providing a signal control path for said system; said control circuit means including dropout signal means for providing a signal indicative of the position and duration of the dropout interval in the video signal; said main circuit means comprising controllable means in the main signal path responsive to the signal provided by said dropout signal means for providing a video output which is fixed at a predetermined level for the period of the dropout interval but otherwise permits the video signal to pass therethrough to the output terminal means, said dropout signal means including means responsive to the absence of horizontal synchronizing signals in the video signal for a period greater than a predetermined time for providing an output signal indicative of the position of each dropout interval.

25. The system of claim 24 wherein said dropout signal means further includes delay means responsive to said indicating output signal for providing a delayed output at a time just prior to the occurrence of the next successive dropout interval and pulse-generating means for providing a clamping signal to said controllable means in the main signal path so that the video output is fixed at a predetermined level for the period of the dropout interval.

26. The system of claim 25 wherein said control circuit means comprises pulse-inserting means responsive to said clamping signal for inserting horizontal synchronizing pulses in the signal of the main circuit means during the dropout interval.

27. The system of claim 25 wherein said control circuit means includes a normally open controllable gating means serially connected in the control circuit path and means responsive to said clamping signal from said pulse generating means for closing said gating means during each dropout interval.

28. The system of claim 25 wherein said delay means is coupled to said means responsive to the absence of horizontal synchronizing signals to inhibit the same during the period of delay.

29. A system for detecting periodic dropout intervals in the reproduction of a modulated composite video signal from a magnetic record medium having such periodic dropout intervals, comprising first means responsive to the composite video signal for providing pulses indicative of the horizontal synchronizing signals thereon, and second means coupled to said first means and responsive to said horizontal pulses for providing an output signal indicating the position of a dropout interval in the event of an absence of such horizontal pulses for a period greater than a predetermined time.

30. The system of claim 29 wherein said second means comprises delay means responsive to the position-indicating signal for providing an output at a time just prior to the occurrence of the next periodic dropout interval.

31. The system of claim 29 wherein said second means comprises a gated integrator circuit having an output which slowly deviates from a reference value in the absence of horizontal pulses thereto and is abruptly restored to its reference value upon the reoccurrence of said horizontal pulses and a differentiating circuit coupled to the output of said gated integrator circuit for providing an output pulse indicative of the termination of a dropout interval.

32. The system of claim 31 wherein said second means further comprises a monostable multivibrator responsive to the output of said differentiating circuit for providing a pulse extending from the termination of said dropout interval to a time just prior to the occurrence of the next successive dropout interval, and means coupling an output of said multivibrator to said gated integrator circuit for inhibiting the operation of said gated integrator circuit during the pulse period.